United States Patent
Wolfe

(10) Patent No.: US 7,079,133 B2
(45) Date of Patent: Jul. 18, 2006

(54) SUPERSCALAR 3D GRAPHICS ENGINE

(75) Inventor: Andrew Wolfe, Los Gatos, CA (US)

(73) Assignee: S3 Graphics Co., Ltd., Grand Cayman (KN)

(*) Notice: Subject to any disclaimer, the term of this patent is extended or adjusted under 35 U.S.C. 154(b) by 0 days.

(21) Appl. No.: 11/069,821

(22) Filed: Feb. 28, 2005

(65) Prior Publication Data

US 2005/0195197 A1    Sep. 8, 2005

Related U.S. Application Data

(63) Continuation of application No. 09/715,701, filed on Nov. 16, 2000.

(51) Int. Cl.
G06T 15/00 (2006.01)
G06T 1/20 (2006.01)
G06F 15/16 (2006.01)

(52) U.S. Cl. ............... 345/419; 345/502; 345/506; 345/574

(58) Field of Classification Search ........ 345/418–428, 345/501–506, 537–538, 520, 522, 553, 574, 345/545, 530; 382/103, 190; 711/100, 117
See application file for complete search history.

(56) References Cited

U.S. PATENT DOCUMENTS

| | | | |
|---|---|---|---|
| 4,930,091 A | 5/1990 | Schroeder et al. | |
| 4,949,280 A | 8/1990 | Littlefield | |
| 4,967,392 A | 10/1990 | Werner et al. | |
| 5,010,515 A | 4/1991 | Torborg, Jr. | |
| 5,325,485 A | 6/1994 | Hockmuth et al. | |
| 5,347,618 A | 9/1994 | Akeley | |
| 5,357,599 A | 10/1994 | Luken | |
| 5,392,385 A | 2/1995 | Evangelisti | |
| 5,408,605 A | 4/1995 | Deering | |
| 5,422,991 A | 6/1995 | Fowler | |
| 5,440,682 A | 8/1995 | Deering | |
| 5,452,412 A | 9/1995 | Johnson, Jr. et al. | |
| 5,457,775 A | 10/1995 | Johnson, Jr. et al. | |
| 5,459,835 A | 10/1995 | Trevett | |
| 5,499,326 A | 3/1996 | Narayanaswami | |
| 5,502,462 A | 3/1996 | Mical et al. | |
| 5,539,911 A | 7/1996 | Nguyen et al. | |
| 5,560,032 A | 9/1996 | Nguyen et al. | |
| 5,572,634 A * | 11/1996 | Duluk, Jr. ................. | 345/419 |
| 5,572,657 A | 11/1996 | Pindeo et al. | |

(Continued)

OTHER PUBLICATIONS

Wolfe, Andrew et al., "A Superscalar 3D Graphics Engine," 32nd Annual Symposium on Microarchitecture, Nov. 17, 1999, Israel.

Primary Examiner—Richard Hjerpe
Assistant Examiner—Wesner Sajous
(74) Attorney, Agent, or Firm—Carr & Ferrell LLP

(57) ABSTRACT

A method, apparatus and computer program product for parallel execution of primitives in 3D graphics engines. It includes detection and preservation of dependences between graphics primitives with the ability to execute multiple independent primitives concurrently while preserving their ordering because the architecture of the graphics engine for the present invention further provides concurrent resources for parallel execution. In a first preferred embodiment, primitives are executed in parallel using an in-order dispatch unit capable of detecting dependencies between primitives. In a second preferred embodiment, an out-of-order dispatch unit is used such that not only are primitives executed concurrently; but, the primitives may be executed in any order when dependencies are detected.

10 Claims, 8 Drawing Sheets

U.S. PATENT DOCUMENTS

| | | |
|---|---|---|
| 5,574,835 A | 11/1996 | Duluk, Jr. et al. |
| 5,574,836 A | 11/1996 | Broemmelsiek |
| 5,574,847 A | 11/1996 | Eckart et al. |
| 5,596,686 A | 1/1997 | Duluk, Jr. |
| 5,602,570 A | 2/1997 | Capps et al. |
| 5,606,657 A | 2/1997 | Dennison et al. |
| 5,632,030 A | 5/1997 | Takano et al. |
| 5,649,173 A | 7/1997 | Lentz |
| 6,108,014 A | 8/2000 | Dye |
| 6,222,550 B1 * | 4/2001 | Rosman et al. ............. 345/419 |
| 6,335,985 B1 | 1/2002 | Sambonsugi et al. |
| 6,353,390 B1 | 3/2002 | Beri et al. |
| 6,417,848 B1 | 7/2002 | Battle |
| 6,552,723 B1 | 4/2003 | Duluk et al. |
| 6,611,264 B1 | 8/2003 | Regan |
| 2002/0158865 A1 * | 10/2002 | Dye et al. .................... 345/419 |
| 2004/0130552 A1 * | 7/2004 | Duluk et al. ................ 345/506 |

* cited by examiner

SUPERSCALAR 3D GRAPHICS ENGINE

The present application is a continuation and claims the priority benefit of U.S. patent application Ser. No. 09/715,701 filed Nov. 16, 2000 and entitled "Superscalar 3D Graphics Engine." The disclosure of this commonly owned application is incorporated herein by reference.

FIELD OF THE INVENTION

The invention relates to 3D graphics systems. More specifically, the invention relates to an architecture for parallel processing of graphics primitives which allows the concurrent execution of multiple graphics primitives while maintaining exact sequential semantics.

BACKGROUND OF THE INVENTION

Since the widespread introduction of graphical user interfaces in computers more than 15 years ago, special-purpose graphics accelerators have been an integral component of desktop computer systems. Recently, 3D applications such as computer gaming, CAD, and visualization applications have been pushing high-performance 3D acceleration from specialty work-stations into mainstream PCs. The demand for increased 3D performance is currently insatiable. Single-chip 3D accelerators today are 50 times faster than those available 3–4 years ago. Each generation substantially improves the quality of the images and yet another factor of 100 still would not produce truly realistic scenes.

Like all computing systems, in order to achieve such rapid increases in performance, it is necessary to improve the microarchitecture of each generation to increasingly take advantage of parallelism. Over the past few years, 3D graphics engines have moved from 32 to 64 to 128-bit memory buses in much the same way that microprocessors grew from 4 to 8 to 16 and eventually to 64 bit bus lines. However, this advancement in 3D graphics engines has diminishing returns, especially as applications move toward a larger number of primitives for each scene to be displayed.

Current high-performance microprocessors all use instruction-level parallelism (ILP) to further increase performance. ILP exploits information about dependences between instructions to allow parallel execution of multiple instructions while maintaining the execution semantics of a sequential program. Many different ILP mechanisms can be effectively employed to improve performance, however dynamically scheduled, out-of-order, superscalar microprocessors are the commercially dominant microarchitecture at the present time.

This invention includes an approach for using dynamically scheduled, out-of-order, superscalar principles for increasing the available parallelism in a 3D graphics engine while maintaining sequential execution semantics. In the abstract, it would seem that graphics, and particularly 3D graphics, is a massively parallel application that would not need ILP technology for high performance. In fact, in many simple graphics applications, it would be possible to render each pixel independently; however, in practice, graphics applications have very similar characteristics to traditional sequential programs. Standard APIs like Direct3D or OpenGL are used to create graphics applications. These are translated via software drivers to a sequence of graphics primitives to be rendered by a graphics engine that consists of some combination of additional hardware and software. The programming model assumes that these primitives will be executed sequentially and atomically, in much the same manner that it is assumed that instructions in a traditional sequential ISA are executed.

Typically, 3D graphics applications will allow blocks of frame buffer memory to be directly read or written by the main processor. This requires that precise frame buffer state be available whenever a direct access executes. This creates a dependence between previous primitives and a direct read or subsequent primitives and a direct write. As in general-purpose computing systems, it is possible to build massively parallel systems that provide excellent performance on a limited set of applications that have been programmed with parallel execution in mind. However, in order to be compatible with a large existing base of software using widely accepted programming interfaces and programming styles, it is necessary to detect the dependences between graphics primitives, extract independent primitives from the instruction stream, and execute them concurrently. Therefore, in order to implement a parallel system for executing this sequence of primitives, the semantics of sequential execution must be maintained. More particularly, several factors cause dependences between graphics primitives which that can prevent concurrent or parallel execution of primitives in a 3D graphics engine.

Z-buffering

Realistic 3D graphics usually include hidden surface removal. More specifically, objects that are behind other objects from the perspective of the viewer should not be visible in the final image. Typically, a Z-buffer is used to implement hidden-surface removal. The Z-buffer stores the distance from the viewpoint to a currently drawn pixel so that when drawing a new pixel, it can be determined if the new pixel is in front of or behind the currently drawn pixel. A well-implemented Z-buffering algorithm should produce the same result even if the triangles are drawn in a different order. However, if the primitives are executed concurrently, then two triangles may be drawn concurrently. If each primitive attempts to concurrently read the same Z-buffer value, modify it, and then write the new value to the Z-buffer using common read and write operations, incorrect results can be produced. A special type of dependence thus exists between any two primitives that must access the same Z-buffer value. Although they can execute in either order, there is currently no known process for executing these primitives concurrently.

Alpha-blending

Alpha-blending is an operation that uses a transparency value (alpha) to permit some portion of an occluded object to be visible through a foreground object. Unfortunately, the primitives that execute alpha-blending operations to make objects appear transparent must be executed in order. The foreground and the background must be executed in order to make the transparent effect appear correct on the image. Accordingly, if the 3D graphics engine does not maintain the semantics of the sequence in which primitives are executed, the image will be incorrect.

Dynamic Textures, Procedural Textures, Environment Mapping

In another feature of realistic 3D graphics, an image (called a texture) can be mapped onto another image; for example, it may be part of the image to have objects reflected off of water displayed in the image. Often these textures have limited life-times. Procedural textures are created on-the-fly by program code. Dynamic textures are loaded into the graphics system memory space from some backing store for a limited time. Environment mapping is a technique for reflections where the 3D objects which is to be reflected is drawn and then copied as an image to be mapped onto a reflective surface. In each of these cases, there is a dependence between the primitives that create the texture and the primitives that render the reflective surface or polygon upon which the texture is projected. Once again, if the 3D graphics engine does not maintain the semantics of the sequence in which primitives are executed, the image will be incorrect.

2D BLITs

Often in 3D graphics, it is advantageous to be able to mix 2D block copy and drawing operations with 3D rendering. If overlapping 2D objects are read or written out of order, the resulting image is incorrect.

Direct Frame Buffer Access

Common graphics API's allow blocks of frame buffer memory to be directly read from or written to at the same time by the processor. This requires that the precise state of the frame buffer be available and known whenever an access to the frame buffer memory executes. This creates a dependence between any previously executed primitives and a direct read or any future executed primitives and a direct write.

Generally, a 3D application creates a series of frames. A 3D graphics engine then identifies each of the objects in a frame and breaks the surface of the object down into a collection of triangles for processing (typically the processing and drawings of the pixels within these triangles are represented by a serious of executable instructions which are referred to as primitives which are processed individually). Each triangle or primitive is specified by three vertices in a 3D space, one or more surface normals, and a description of how to draw the triangle's surface, i.e. texturing, alpha blending parameters, etc. Accordingly, from the point of view of a 3D graphics engine, a frame consists of a collection of triangles or primitives which are all processed and executed separately thereby rendering the entire frame or image. The 3D graphics engine is responsible for processing each triangle or primitive and converting them each into pixels, which when displayed render the entire 3D frame.

FIG. 1 illustrates a block diagram which shows a prior art 3D processing pipeline resident in a prior art 3D graphics engine. Generally, the graphics engine identifies the triangular coordinates for each primitive within the shared world space of the entire image, applies lighting to the triangles or primitives, transforms each triangle or primitive from the 3D space used by the application into 2D screen coordinates, and draws the appropriate pixels into the frame buffer (applying any shading, z-buffering, alpha bending etc.).

Referring now to FIG. 1, and more specifically, a first stage in a pipeline is a world transform stage 105, in which the graphics engine converts the vertices and normals of the triangle from the real world object space, which may be different for each object in the scene, to the shared world space, which is space shared by all of the objects to be rendered in the entire scene. This transform consists of a matrix-vector multiplication for each vertex and each normal. In a second stage of the pipeline, a lighting stage 110, the graphics engine takes the triangle's color and surface normal(s) and computes the effect of one or more light sources. The result is a color at each vertex. At the next stage in the pipeline, a view transform stage 115, the graphics engine converts the vertices from the world space to a camera space, with the viewer (or camera) at the center or origin and all vertices then mapped relative from that origin. Additionally, in the view transform stage 115, the graphics engine applies a matrix-vector multiplication to each vertex calculated for the camera space.

As further shown in FIG. 1, the next stage in the pipeline is a projection transform stage 120. At the projection transform stage 120, the graphics engine maps the vertices for the camera space to the actual view space. This includes the perspective transformation from 3D to 2D. Accordingly, at this point in the pipeline, the vertices are effectively two-dimensional to which perspective effects (i.e., depth fore-shortening) have been applied. Accordingly, the third (z) coordinate is only needed to indicate the relative front-to-back ordering of the vertices when the objects are rendered or drawn within the view space. Like the other two transform stages in the pipeline, the projection transform stage requires the application of a matrix-vector multiplication per each vertex. In a clipping stage 125, the graphics engine clips the triangles or primitives to fit within the view space. Accordingly, the triangles or primitives which lie entirely off the side of the screen or behind the viewer are removed. Meanwhile, triangles or primitives which are only partially out of bounds are trimmed. This generally requires splitting the resulting polygon into additional multiple triangles or primitives and processing each one of these additional triangles or primitives separately. Finally, in a rasterization stage 130, the graphics engine converts those triangles to be displayed within the view space into pixels and computes the color value to be displayed at each pixel. This includes visible-surface determination (dropping pixels which are obscured by a triangle closer to the viewer), texture mapping, and alpha blending (transparency effects).

FIG. 2 further illustrates how a prior art rasterizer stage 130 in a 3D graphics engine operates. First, the rasterizer calculates the centers for each pixel in the triangle or primitive and assigns x and y values to these centers. The rasterizer stage then converts each triangle or primitive into a series of horizontal spans, with one span generated for each integer y value that falls inside the triangle. For each horizontal span, the rasterizer computes the two endpoints, i.e. the points where the horizontal span crosses the edges or boundaries of the triangle or primitive. The rasterizer will also interpolate color values and perspective-corrected texture coordinates for the endpoints. Next, the rasterizer generates the series of pixels along the span, again interpolating color and texture coordinates for each pixel between the two endpoints of the horizontal span. Several operations are then performed at each pixel. First each pixel has its z (depth) value compared to the z (depth) value for the currently displayed pixel in the same location. The currently displayed pixel has its z (depth) value stored in a z buffer. If the comparison indicates that this new pixel is behind the old one, the new pixel is discarded. If the comparison indicates that this new pixel is in front of the old pixel then the z test succeeds and the new pixel color is computed. This can include texture mapping and alpha blending. Accordingly, prior art 3D graphics are computed serially because each z (depth) value must be compared to the previously displayed z (depth) value.

Generally, a prior art 3D graphics engine will serially perform these steps on each triangle or primitive one at a time, such that the triangles or primitives are processed in an orderly fashion one after the other in series. One reason this is done is to avoid any dependencies which may occur between the primitives or triangles as they are each executed. As explained earlier, as each primitive is executed for processing, the z values for each pixel location in the triangle or primitive is compared with the z value previously displayed in that same location on the two dimensional screen in order to determine whether the new pixel should overwrite (appear in front of) the old value or be ignored (appear behind). If the triangles are not executed in order, then the z value-test results will be faulty.

However, the present invention is directed toward a method, apparatus and computer program product for parallel execution of primitives in 3D graphics engines. It includes detection and preservation of dependences between graphics primitives. Accordingly, the present invention has the ability to execute multiple independent primitives concurrently while preserving their ordering because the architecture of the graphics engine for the present invention further provides concurrent resources for parallel execution. In a first preferred embodiment, primitives are executed in parallel using an in-order dispatch unit capable of detecting dependencies between primitives. In a second preferred embodiment, an out-of-order dispatch unit is used such that not only are primitives executed concurrently; but, the primitives may be executed in any order when dependencies are detected.

DETAILED DESCRIPTION OF PREFERRED EMBODIMENTS

In the present invention, an out-of-order dispatch 3D graphics engine detects dependences and maintains sequential semantics at the rasterizer stage to extract ILP from the graphics primitive stream. Multiple rasterization engines are used to provide execution resources for the graphics primitives such that multiple graphics triangles or primitives may be executed at the same time. Since primitives can have long execution times, from several cycles to several hundred thousand cycles, it is not very important to dispatch more than one primitive per cycle, although it is possible to do so. However, it is important to have many primitives executing concurrently. Also, since the primitives do many memory accesses and require an indeterminate number of cycles to execute, it is best to have the rasterization engines run independently. Accordingly, in a preferred embodiment of the present invention, the graphics engine operates in a multiple instruction/multiple data MIMD fashion, which means the graphics engine is capable of processing multiple primitives at the same time.

In Order Dispatch Unit

Figure 1:
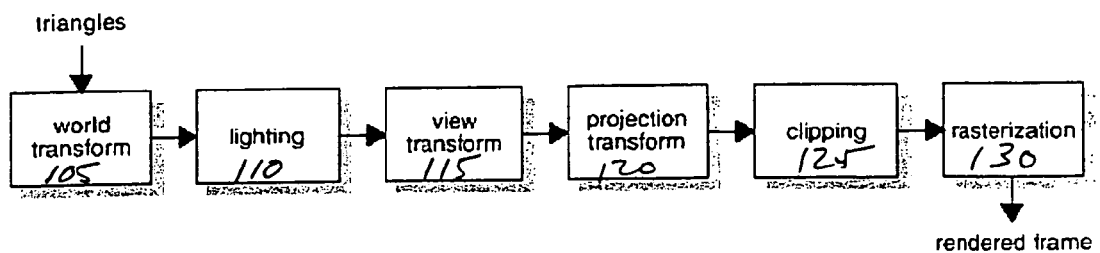
FIG. 1 illustrates a block diagram which shows a prior art 3D processing pipeline resident in a prior art 3D graphics engine.
Figure 2:
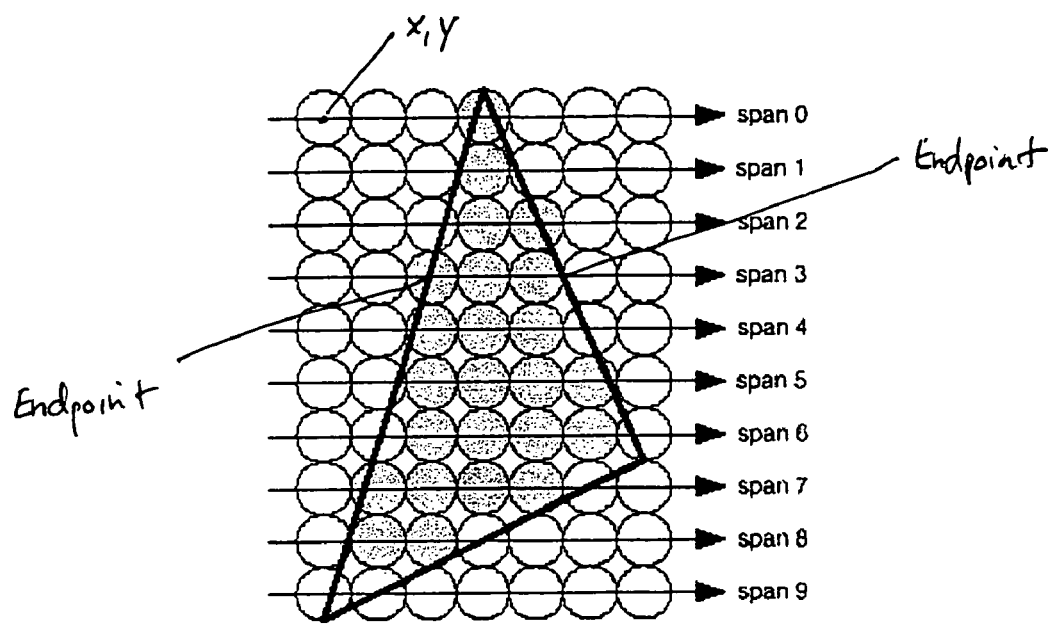
FIG. 2 illustrates further how a prior art rasterizer stage 130 in a 3D graphics engine operates.
Figure 3A:
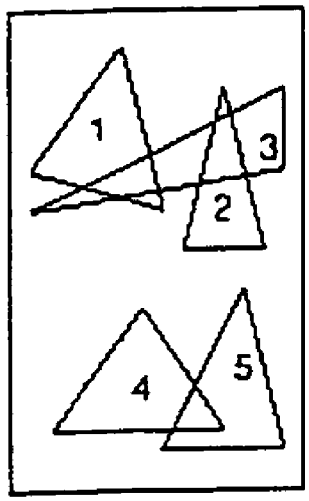
FIGS. 3a–b illustrate how a first preferred embodiment of a 3D graphics engine uses an in-order dispatch mechanism which dispatches each primitive from the head of the input list, in order, as an accelerator becomes available.
Figure 3A:
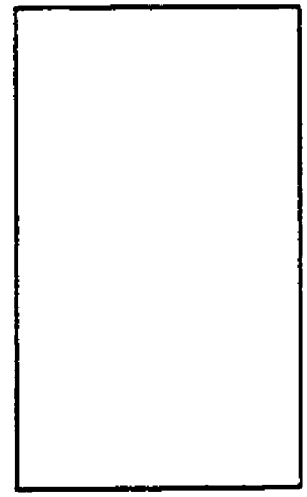
Figure 3B:
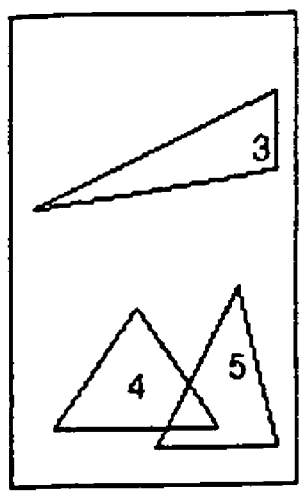
Figure 3B:
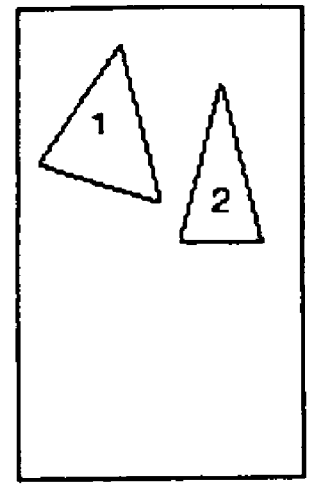

FIGS. 3a–b illustrate how a preferred embodiment of a graphics engine uses an in-order dispatch system in order to dispatch primitives for concurrent execution by two or more graphics accelerators in accordance with the present invention. In this embodiment, each primitive is ranked in order in an input list and is dispatched from the head of the input list, in order, as an accelerator becomes available. As shown in FIG. 3a, a 3D image is broken into a number of triangles or primitives, i.e. each triangle is a primitive which must be processed for display by the graphics engine. In a typical prior art 3D graphics engine, the coordinates for the vertices of the primitives are stored in a queue for serial execution/processing by the 3D graphics engine. The primitives are executed in order serially one at a time from the queue. However, in the present invention more than one primitive may be executed at a time so the queue has what is referred to as an in-order dispatch system.

Assume in the preferred embodiment illustrated that there are two graphics accelerators capable of executing two graphics primitives in parallel such that two primitives may be dispatched to the two simultaneously executing accelerators/rasterizers in the 3D graphics engine. Accordingly, FIG. 3b shows primitives 1 and 2 being executed while primitives 3, 4 and 5 remain in the queue. When using an in-order dispatch unit in accordance with a preferred embodiment of the present invention, each subsequent primitive is tested against currently executing primitives in order to detect any dependencies. Accordingly, in our example, primitive 3 will be tested against primitives 1 and 2 for dependencies. Since primitive 3 overlaps primitives 1 and 2, primitive 3 cannot be executed until primitives 1 and 2 are both complete. This is because triangles associated with primitives 1 and 2 are both overlapped by the triangle represented by primitive 3. Thus, even if primitive 1 completes before primitive 2, primitive 3 cannot begin processing/execution until primitive 2 has completed. In this embodiment, the graphics engine cannot execute primitive 4 because it includes an in-order dispatch system which does not permit out of order execution and processing of the primitives. Accordingly, the in-order dispatch system prevents the next primitive in the list from executing until all previous primitives that overlap that primitive have been completed and all primitives which are in the queue before that primitive have executed. This allows for parallel processing and execuion of primitives while preserving the ordering and integrity of the primitives thereby insuring that the final graphic is properly drawn.

Out of Order Dispatch

Figure 4A:
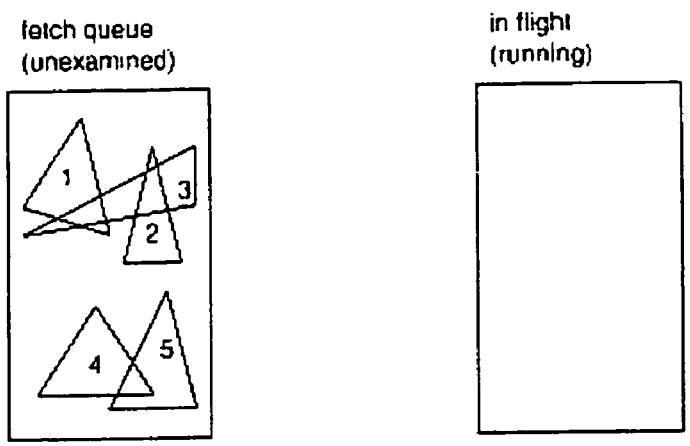
FIG. 4a–c illustrate the basic concepts used in the process of 3D graphics in accordance with a second preferred embodiment of the present invention which uses an out-of-order dispatch mechanism.
Figure 4B:
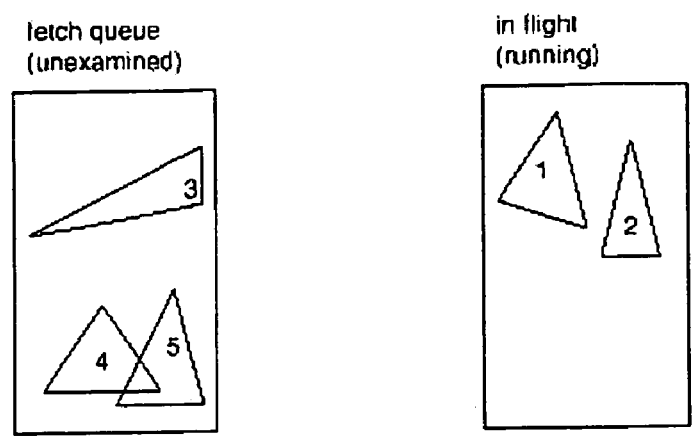
Figure 4C:
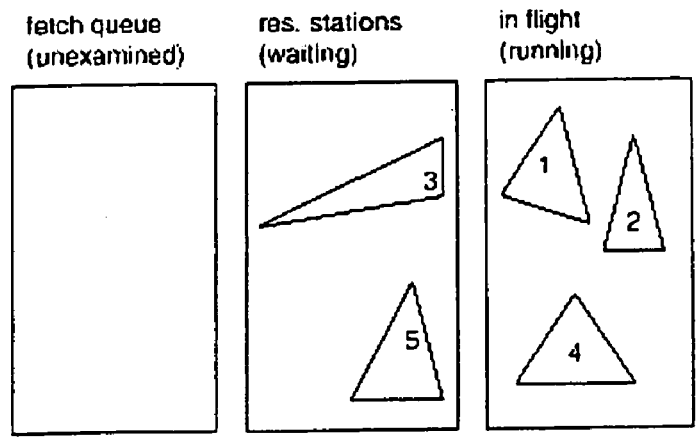

FIG. 4a–c illustrate how a preferred embodiment of a graphics engine uses an out-of-order dispatch system in order to dispatch primitives for concurrent execution by two or more graphics accelerators in accordance with the present invention As shown in FIG. 4a, a 3D image is broken into a number of triangles, each triangle represented by a primitive. The primitives are stored in a queue for execution/processing by the 3D graphics engine.

Assume in the preferred embodiment illustrated that there are two graphics accelerators capable of executing two graphics primitives in parallel such that two primitives may be dispatched to the two simultaneously executing accelerators/rasterizers in the 3D graphics engine. However, unlike the preferred embodiment which utilizes an in-order dispatch unit, in the embodiment which utilizes an out of order dispatch unit, the primitives may be executed out-of-order since the queue has an out-of-order dispatch system.

Accordingly, once again assume in the example illustrated that two primitives may be dispatched to two simultaneously executing accelerators/rasterizers in the 3D graphics engine. FIG. 4b shows primitives 1 and 2 being executed while primitives 3, 4 and 5 remain in the queue. When using the out-of-order dispatch unit in accordance with a preferred embodiment of the present invention, each subsequent primitive is tested against currently executing primitives in order to detect any dependencies. Accordingly, in our example, primitive 3 will be tested against primitives 1 and 2 for dependencies. Since primitive 3 overlaps primitives 1 and 2, it cannot be executed until primitives 1 and 2 are both complete. Using the out-of-order dispatch unit, if primitive 1 completes before primitive 2, primitive 3 may be bypassed and primitive 4 is then processed/executed. Once primitive 2 completes processing, then primitive 3 may be executed. Accordingly, the out-of-order dispatch system prevents the next primitive in the list from executing until all previous primitives that overlap that primitive have been completed while allowing subsequent primitives which do not overlap to be executed. This allows for parallel processing and execution of primitives while preserving the ordering and integrity of the primitives thereby insuring that the final graphic is properly drawn.

Therefore, utilizing the preferred embodiment of the present invention in which an out-of-order dispatch unit is used, although primitive 3 cannot be approved for execution since it overlaps with the currently executing primitives, in order to extract additional parallelism, it is preferable to allow out of-of-order dispatch of other primitives in the queue. In this case, stalled operations or primitives which cannot be executed are placed into central reservation stations (i.e. primitive 3) and other operations that can proceed independently (i.e. other primitives which can be processed immediately since there is no overlap) are allowed to bypass them. Accordingly, if either primitive 1 or 2 completes before the other, primitive 4 can begin execution, as shown in FIG. 4c.

Dependency Checking

In both embodiments (i.e. using either an in-order or an out-of-order dispatch mechanism), all incoming primitives are placed in reservation stations and the oldest eligible candidate (i.e., the oldest primitive eligible for execution which has no dependencies) is dispatched each cycle as an accelerator/rasterizer becomes available. Accordingly, in both embodiments, it is necessary to have a mechanism for checking the dependency of each incoming primitive against each primitive currently being processed by one of the accelerator/rasterizer. The preferred embodiment which uses an in-order dispatch unit will only allow primitives to be executed concurrently in order so long as no dependencies exist. The preferred embodiment which uses an out-of-order dispatch unit is able to bypass primitives which are dependent and execute the next oldest eligible candidate in the queue. Each of these embodiments will be described in greater detail; but, first, the mechanism for checking dependencies is similar in both the in-order and out-of-order systems and will be described herein.

In order to implement parallel processing and execution of primitives, mechanisms are required for detecting dependences, for detecting ready operations, and for tracking completion of operations. In a preferred embodiment, dependence checking is accomplished by comparing the source and destination register addresses of a candidate operation yet to be processed/executed with those of previous operations in the sequential instruction stream which are being currently processed/executed. If a corollary exists for graphics primitives they are said to be dependent.

More specifically, any given graphics primitive has a set of destination pixel locations where it will, upon completion of the operation, draw the graphics. The graphics primitive will also have one or more sets of source pixels which are read for performing the drawing operation. The destination pixels are the ones drawn by the rasterization operation and the source pixels may include the old pixels in those locations that will be alpha-blended and texture mapped in order to draw the triangle.

In the present invention, using a unique algorithm for detecting dependences, every dispatched primitive reserves a region of the frame buffer corresponding to a bounding box surrounding each of its operands. The sets of pixel locations that each primitive reads in order to complete its drawing operation are called its source operands and bounding boxes surrounding each of the source operands are called the source regions. The set of pixel locations where each primitive will draw its graphics upon completion is called its destination operand and a bounding box around it is the destination region. Bounding boxes are preferably computed by taking the minimum and maximum values of the x and y coordinates of each vertex for the box, which must be large enough to include all the destination or source pixel locations.

Graphics primitives can have several source regions as well as a destination region; but, for simplicity, consider a case where there is one of each. In this case and referring to FIG. 4c, a previously dispatched (and currently processing/executing) primitive D 402 will have a set of source pixel locations or a source operand surrounded by a bounding box and a set of destination pixel locations or a destination operand which is also surrounded by a bounding box. A candidate (or new primitive which has yet to be processed/executed) P 404 will also have a set of source pixel locations or a source operand surrounded by a bounding box and a set of destination pixel locations or a destination operand which is also surrounded by a bounding box. In a preferred embodiment, in order to determine whether or not the candidate primitive P depends on the previously dispatched primitive D, the function depend(P,D) is computed. Now, if $S_P$ is the source region of P and $D_P$ is the destination region of P and, furthermore, $S_D$ and $D_D$ are the source and destination regions of D, the dependency between the two can be determined by the following equation:

$$\text{depend}(P,D) = (S_P \cap D_D) + (D_P \cap D_D) + (D_P \cap S_D)$$

If depend(P,D) is false then P can be dispatched concurrently with D. Dependency is said to be false for any two concurrently dispatched primitives even if their source regions overlap, so long as neither source region for either primitive overlaps with the destination region of the other primitive and so long as the destination regions of the two primitives do not overlap.

In accordance with the equation given above, in order to determine dependency, three tests are performed. The first test prevents any read after write (RAW) hazards caused by reading a source pixel prior to it being written by the earlier primitive. The second test prevents any write after write (WAW) hazards caused by writing a pixel from the second primitive prior to writing the same pixel from the first primitive. The third test prevents any write after read (WAR) hazards caused by writing a pixel from the second primitive prior to reading the same pixel for the first primitive. The WAR hazard is somewhat unique in that it would be prevented in any well constructed processor pipeline by reading the source operands of the first instruction from the register file early in the pipeline and retaining a copy of the correct value until it is actually used in the pipeline. However, it is sometimes impractical to copy the values of all of the source pixels for a graphics primitive, so the source region in a preferred embodiment is reserved in memory until an operation completes, and the WAR test is performed against any subsequently issuing primitives.

Figure 5:
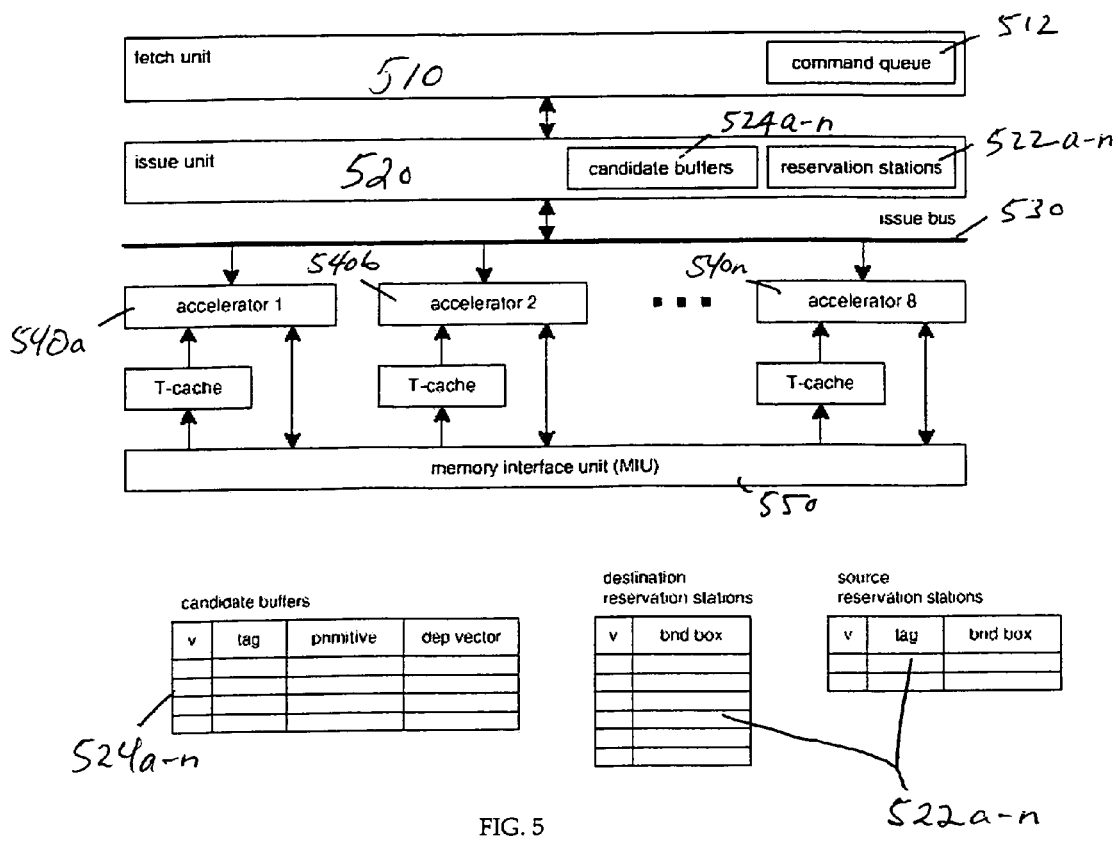
FIG. 5 illustrates a functional block diagram showing an out-of-order dispatch mechanism in accordance with a preferred embodiment of the present invention.

FIG. 5 illustrates a preferred embodiment of the present invention which utilizes either an in-order dispatch mechanism or an out of order dispatch mechanism for providing graphics primitives to a plurality of graphics accelerators/rasterizers. As shown, the preferred embodiment of the present invention is comprised of a fetch unit 510, an issue unit 520, a bus line 530, several parallel 3D graphics accelerators/rasterizers 540*a–n*, and a memory interface unit 550. The fetch unit 510 includes a command queue 512 which contains all of the graphics primitives to be processed and displayed in a single frame. The issue unit 520 includes reservation stations 522*a–n* and candidate buffers 524*a–n*. As reservation stations 522*a–n* in the issue unit 520 become available, primitives are passed from the command queue 512 to the reservation stations 522*a–n* in the issue unit 520 for dependence testing and scheduling.

In a preferred embodiment, the issue unit 520 can issue one primitive per cycle to any one of the several graphics accelerators/rasterizers 540*a–n* for rasterization. As each primitive is completed, the graphics accelerator/rasterizer 540*a–n* executing that primitive then notifies the issue unit 520 so that the primitive can be retired and the reservation stations 522*a–n* associated with that primitive can be cleared. The graphics accelerators 540*a–n* access a memory (not shown) through a global memory interface unit 550. In a preferred embodiment, the memory interface unit 550 may be comprised of a large switch with many independent memory banks to provide adequate bandwidth with the memory comprising a single I/O ported memory array such that the memory interface unit 550 may retrieve information from any address in the array and buffer the information in any one of the memory banks.

In a preferred embodiment, the reservation stations 522*a–n* each use three sets of registers to store data about pending and executing primitives. A first set of registers are known as the destination reservation stations which hold bounding box coordinates which identify the destination region for each new primitive as it is passed from the command queue 512 in the fetch unit 510 to the reservation stations 522*a–n* in the issue unit 520. For simplicity in understanding the invention, in this example it is assumed that every primitive has exactly one destination region and the coordinates for the bounding box for that destination region is stored in the destination reservation station. It is understood that in alternative embodiments, a primitive may have more than one destination region, in which case dependencies between any two primitives will have to be resolved for each destination region before the primitive having more than one destination region can be executed.

It is understood that in the preferred embodiment, a primitive may also have zero, one, or two source regions. Accordingly, a second set of registers known as the source reservation stations are used to store bounding box coordinates which identify source regions for each of the primitives passed from the command queue 512 in the fetch unit 510 to the reservation stations 552*a–n* in the issue unit 520. Each source reservation station contains a bounding box descriptor or coordinates for each source region and a tag that is used as an address index between the source reservation station and the corresponding destination reservation stations where the corresponding destination region which uses that source region is stored. For example, it is assumed there is one destination region for primitive 1 and that destination region is stored in a destination reservation station. Let us further assume that primitive one has two different source regions. Bounding box coordinates for each source region associated with primitive 1 are stored in the source reservation stations along with tags which identify the addresses location in the destination reservation stations where the corresponding destination region coordinates are stored.

Finally, the candidate buffers 524*a–n* each hold relevant information about unissued primitives. Unissued primitives are those which have not yet been sent to a graphics accelerator/rasterizer for processing 540*a–n*. This relevant information includes the opcode and additional operands for the primitive (such as vertex colors, alpha values, etc.) and a dependence vector that describes any restrictions on issuing the primitive. Alternatively, a pointer to the opcode and operand can be included rather than the actual data and the data can be stored in a memory and accessed via the memory interface unit 550 once the primitive is passed to one of the accelerators/rasterizers 540*a–n* for processing. Once again, in a preferred embodiment, the candidate buffers include a tag which is used to specify the address of the location in the destination reservation station index where the bounding box coordinates of the destination region for that primitive are stored.

In a preferred embodiment, every entry in the source and destination reservation stations and every entry in the candidate buffers has a valid bit that is used to indicate whether that entry contains live data or not. Ideally, the number of destination reservation stations should equal the number of candidate buffers plus the number of accelerators/rasterizers 540*a–n* such that there are a sufficient number of destination reservation stations to store bounding box coordinates for those primitives being executed and those yet to be executed in the queue.

Figure 6A:
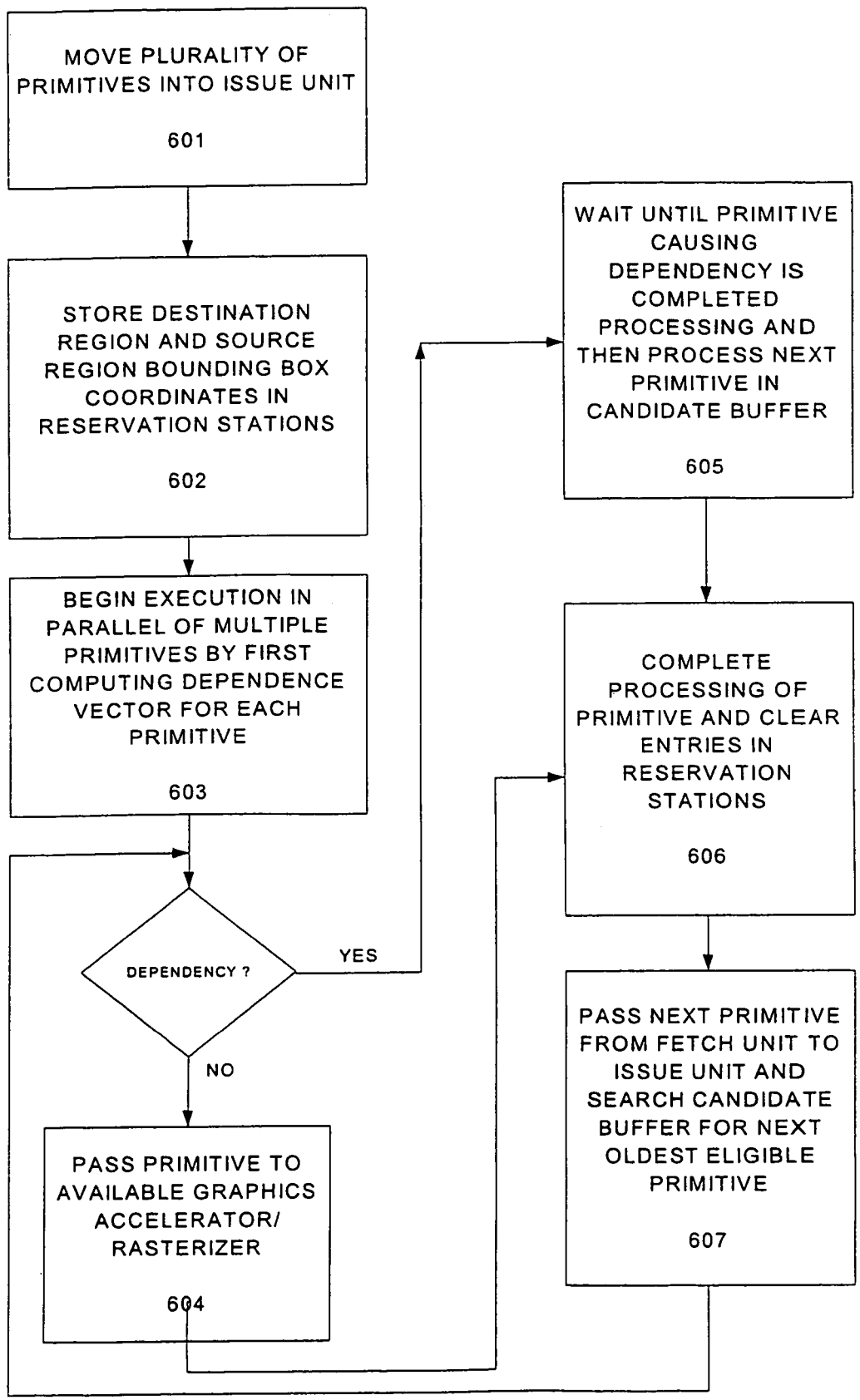
FIGS. 6a and 6b illustrate the process executed when processing graphics primitives and using either an in-order or an out-of-order dispatch mechanism in accordance with a preferred embodiment of the present invention.

FIG. 6*a* illustrates the process executed when processing graphics primitives and using an in order dispatch mechanism in accordance with a preferred embodiment of the present invention. First, a plurality of primitives are moved into the issue unit from the fetch unit, one primitive being moved each clock cycle provided that there is an empty destination reservation station, an empty candidate buffer, and enough empty source reservation stations to hold all the source regions used by that primitive STEP 601. In a preferred embodiment, hardware, firmware or software resident in the fetch unit has already decoded the primitive type and computed the bounding box coordinates for each source and destination region. When the primitive is moved from the issue unit into the fetch unit, the coordinates for the bounding boxes are stored in the source and destination reservation stations, accordingly, and the address index of the location of the destination region in the destination reservation station is stored in the tag field of the source reservation stations and the candidate buffer STEP 602.

Once every candidate buffer entry is full, the primitives stored in the buffer can begin executing. Thus, in an embodiment which utilizes an in-order dispatch unit, the primitives in the candidate buffer can begin executing in order. Before each primitive is passed to an available accelerator/rasterizer, a dependence vector is computed for that primitive STEP 603. It is obvious that for the first primitive in the candidate buffer there should be no dependency conflicts. After that, the dependencies between each subsequent primitive and any currently processing or executing primitives are determined. Dependencies are computed for single source and single destination primitives in accordance with the dependent function equation provided earlier. If any one primitive has more then one source region, a variation of the depend function equation is used to compute dependency for each of the two source regions of the primitive. For example, if each primitive has 2 source regions then the dependency function would be as follows:

$$\text{depend}(P,D) = (S_{P0} \cap D_D) + (S_{P1} \cap D_D) + (D_P \cap D_D) + (D_P \cap S_{D0}) + (D_P \cap S_{D1})$$

If there is no dependency conflict, the primitive is then passed to one of the available graphics accelerators/rasterizers 540a–n STEP 604. If there is a conflict, the primitive is not passed to the next available graphics accelerator/rasterizer 540a–n. Instead, the system will await until the primitive which is currently executing and causing the dependency in completed and then the next primitive will be passed to an available accelerator/rasterizer STEP 605. Remember, this is a preferred embodiment in which an in-order dispatch unit is used and, therefore, it is not possible to execute the primitives out of order.

Once all of the accelerators/rasterizers 540a–n are loaded (assuming they can all be loaded since if no dependencies are detected), no more primitives can be passed until at least one of the accelerators/rasterizers becomes available. When a graphics accelerator/rasterizer completes executing a primitive, the entries in the source and destination reservation stations for that primitive are cleared, as well as the entry in the candidate buffer STEP 606. The candidate buffer in the issue unit which was holding the information for that now completed primitive is now available and a new primitive can then be passed from the fetch unit to the issue unit STEP 607 in accordance with the explanation provided above. Furthermore, whenever any graphics accelerator/rasterizer is not busy executing a primitive, the candidate buffer is searched for the next primitive in the list STEP 607. Accordingly, as each primitive completes execution, the candidate buffer is searched for the oldest entry. The oldest primitive in the candidate buffer then has its dependency calculated once again to ensure there are no conflicts. If there are conflicts then the in-order dispatch mechanism will not pass the next primitive to the available accelerator/rasterizer; but, will wait for the currently executing primitive which is causing the dependency to complete execution before executing the next primitive in the candidate buffer.

Figure 6B:
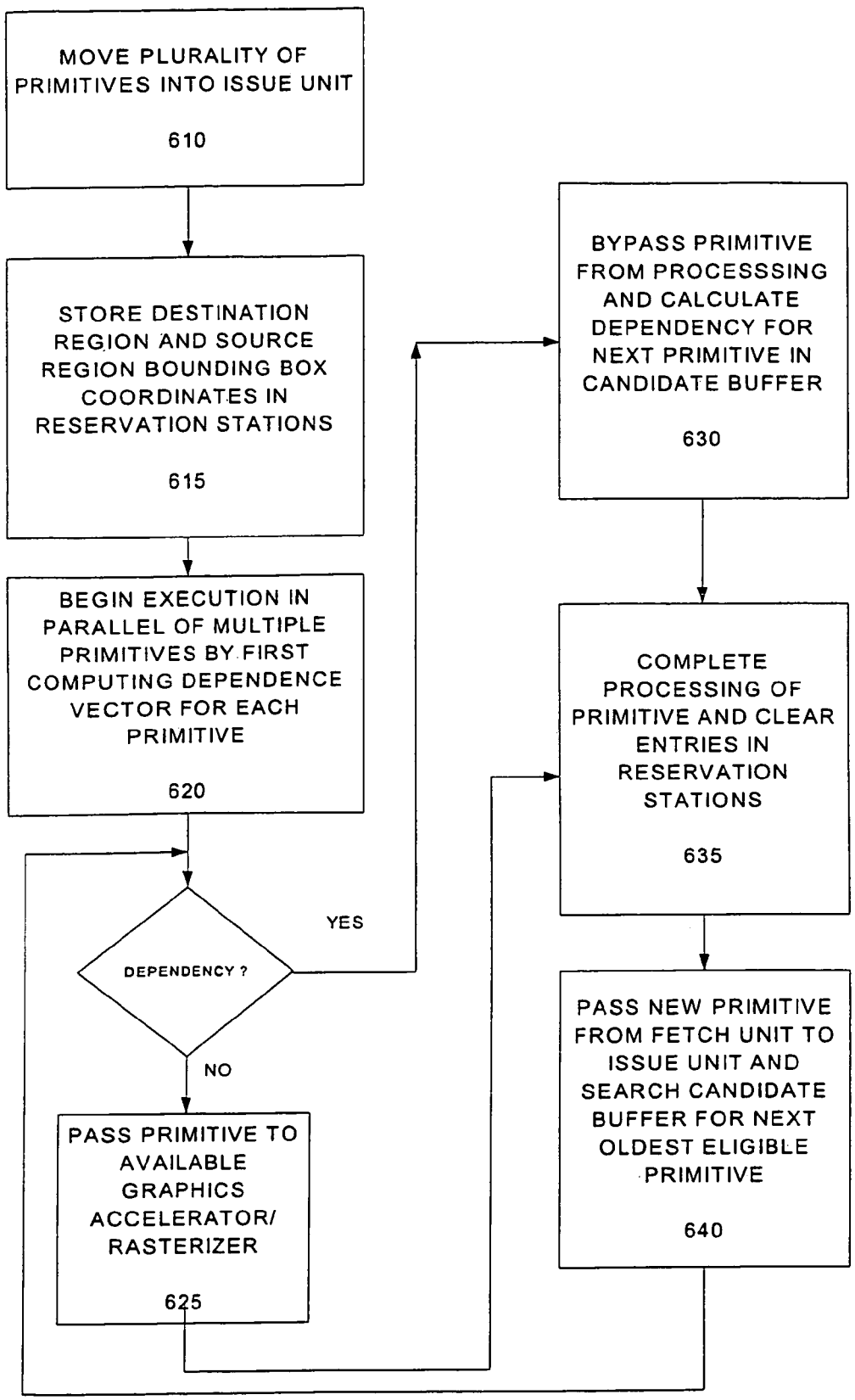

FIG. 6b illustrates the process executed when processing graphics primitives and using an out-of-order dispatch unit in accordance with a second preferred embodiment of the present invention. A plurality of primitives are first moved into the issue unit from the fetch unit, one primitive being moved each clock cycle provided that there is an empty destination reservation station, an empty candidate buffer, and enough empty source reservation stations to hold all the source regions used by that primitive STEP 610. In a preferred embodiment, hardware, firmware or software resident in the fetch unit has already decoded the primitive type and computed the bounding box coordinates for each source and destination region. When the primitive is moved from the issue unit into the fetch unit, the coordinates for the bounding boxes are stored in the source and destination reservation stations, accordingly, and the address index of the location of the destination region in the destination reservation station is stored in the tag field of the source reservation stations and the candidate buffer STEP 615.

Once the candidate buffer is full, the primitives stored in the buffer can begin executing. Thus, for each primitive in the candidate buffer, a dependence vector is computed STEP 620. It is obvious that for the first primitive in the candidate buffer there should be no dependency conflicts. After that, the dependencies between each subsequent primitive and any currently processing or executing primitives are determined.

If any one primitive has more then one source region, a variation of the depend function is used to compute dependency for each of the two source regions of the primitive as shown above. If there is no dependency conflict, the primitive is then passed to one of the available graphics accelerators/rasterizers 540a–n STEP 625. If there is a conflict, the primitive is not passed to the next available graphics accelerator/rasterizer 540a–n. Instead, since this embodiment utilizes an out-of-order dispatch mechanism, that primitive will be bypassed and the next primitive in the candidate buffer will have its dependency computed STEP 630.

Once all of the accelerators/rasterizers 540a–n are loaded, no more primitives can be passed until at least one of the accelerators/rasterizers becomes available. When a graphics accelerator/rasterizer completes executing a primitive, the entries in the source and destination reservation stations for that primitive are cleared, as well as the entry in the candidate buffer STEP 635. A new primitive can then be passed from the fetch unit to the issue unit in accordance with the explanation provided above STEP 640. Furthermore, when a graphics accelerator/rasterizer completes executing a primitive, the candidate buffer is searched for the next oldest and eligible primitive STEP 640. In this embodiment which uses an out of order dispatch unit, the next oldest and eligible primitive is defined as that primitive in the candidate buffer which is the oldest and which has no dependency conflicts. Accordingly, as each primitive is executed, a new primitive is loaded into the issue unit and the candidate buffer is searched for the oldest entry. The oldest primitive in the candidate buffer then has its dependency calculated once again to ensure there are no conflicts.

Hardware for Computing Dependencies

Figure 7:
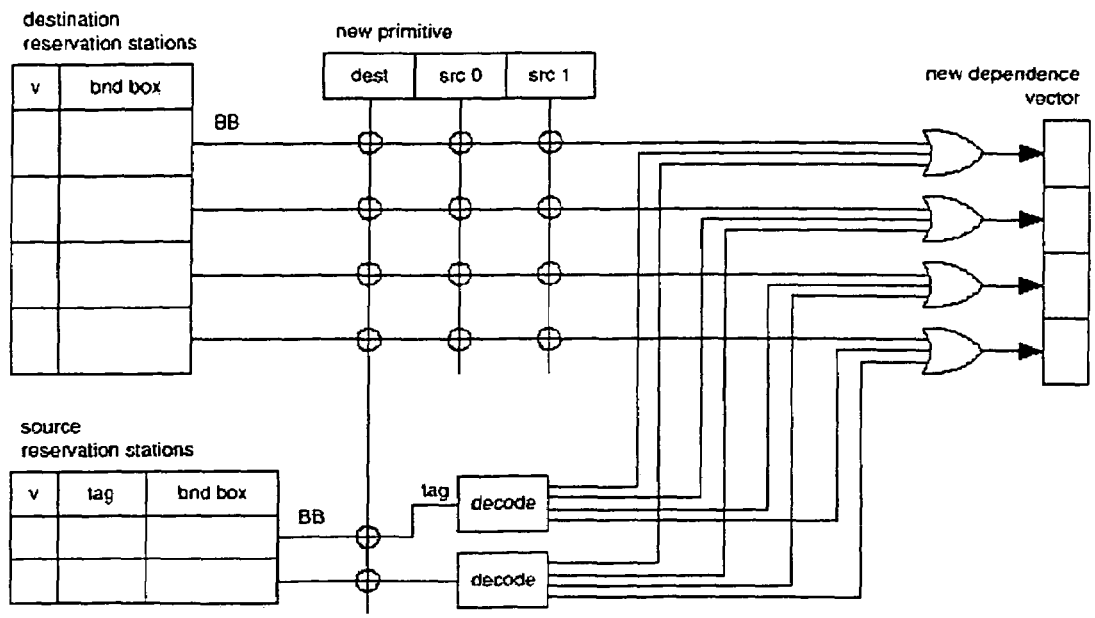
FIG. 7 illustrates a block diagram which shows a preferred embodiment of the hardware used to compute dependency vectors for each primitive.

A preferred embodiment of hardware used to compute dependencies is shown in FIG. 7. As shown in FIG. 7, the bounding box coordinates for destination regions and source regions of a new primitive are driven onto vertical buses for each operand. In the example shown, the new primitive has a single destination region 701 and two source regions 702 and 703. Additionally, the bounding box coordinates for destination regions which are stored in each valid reservation station are driven onto horizontal bus lines. At intersections which correspond to potential hazards, bounding box coordinate overlap comparators 704 implement the depend function described earlier. For example, a first comparator 704a may compare the destination region (i.e., destination bounding box) of a previously dispatched primitive with the destination region of the new primitive, and subsequently generate a first resultant bit. Similarly, a second comparator 704b may compare the source region (i.e., source bounding box) of the previously dispatched primitive with the destination regional of the new primitive, and generate a second resultant bit. Furthermore, a third comparator 704c may compare the destination region of the previously dispatched primitive with the source region of the new primitive, and generate a third resultant bit. Although only three comparators are used in this example, alternatively, a different number of comparators may be utilized. Subsequently, a logic OR gate 706 receives the first, second, and third resultant bits and performs a logic OR operation in order to determine whether any dependencies exist between the previously dispatched primitive and the new primitive. A dependence vector is thus calculated by computing whether or not the destination regions or source regions of the new primitive overlap with the destination regions of each (previously dispatched) primitive which is currently executing. Bit k in the dependence vector is set if the new primitive must wait for the primitive stored in destination reservation station k to complete, where k is the position in the destination reservation station where the conflicting primitives' destination region coordinates are stored (i.e., destination reservation station 1, destination reservation station 2, etc.). This dependence vector is stored in the candidate buffer reserved for the new primitive. At the same time, the issue unit is testing the existing issue candidates to see if any are ready to be issued. If any of the accelerators/rasterizers are available, then the issue unit tests all of the dependence vectors in the candidate buffers. If any valid candidate buffer contains a dependence vector of all zeros, then the primitive in the candidate buffer can be passed to the available graphics accelerator/rasterizer for processing on the next cycle. In a preferred embodiment, if more than one primitive in the candidate buffer has no dependency conflicts then that entry which corresponds with the earlier primitive or the primitive which has been in the candidate buffer the longest is the one which is selected for processing. At the next clock cycle, the primitive from the candidate buffer is issued by transferring the primitive data and the tag to the available accelerator and clearing the valid bit in order to free that space up in the candidate buffer so a new primitive can be passed from the fetch unit to the issue unit.

As explained earlier, as the accelerators/rasterizers complete execution and processing of a primitive, the tag corresponding with that primitive is returned to the issue unit. The issue unit will then clear the valid bit for the entry in the destination reservation station which corresponds with that primitive to free up that space in the destination reservation station. The issue unit will also use the tag corresponding with the completed primitive to clear valid bits in the source reservation stations in order to make these spaces available for other primitives. Finally, the tag is decoded and the corresponding bit in any dependence vector in the candidate buffer is cleared. This removes all information associated with the completed primitive from the reservation stations and clears any dependencies for pending primitives associated with that primitive. Once all of the dependence bits in a candidate's dependence vector have been cleared, that candidate is then said to be eligible and can then pass to a graphics accelerator/rasterizer on a subsequent clock cycle.

The above description is intended to illustrate the operation of the preferred embodiments of the present invention and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method for parallel processing of a plurality of 3D primitives in an out of order sequence comprising:
    storing the plurality of 3D primitives in a queue;
    processing at least two of the primitives in order in parallel, where that at least two of the primitives have no dependency and wherein a first primitive in the at least two is completely processed before the others;
    detecting a dependency between a next primitive to be processed from the plurality in the queue and the primitives in the at least two which have not yet been completely processed; and
    skipping the next primitive to be processed from the plurality in the queue and processing a subsequent primitive from the plurality in the queue, wherein no dependency is detected between the subsequent primitive and the primitives in the at least two which have not yet been completely processed.

2. The method of claim 1 where the step of detecting is comprised of:
    comparing destination regions for the primitives in the at least two which have not yet been completely processed with a new destination region and source regions for the next primitive to be processed in order to detect any overlap; and
    detecting a dependency where there is an overlap between the destination regions for the primitives in the at least two which have not yet completely processed and either the new destination region or the source regions for the next primitive to be processed.

3. A method for providing out of order processing of a plurality of 3D primitives comprising:
    storing the plurality of 3D primitives, including source and destination region bounding box coordinates for each primitive, in an issue unit;
    processing at least two of the primitives in parallel, where that at least two of the primitives have no dependency; and
    detecting a dependency between a next primitive to be processed from the plurality in the issue unit and the primitives in the at least two which have not yet been completely processed, wherein the next primitive to be processed from the plurality in the issue unit is skipped if a dependency is detected.

4. The method of claim 3, wherein a subsequent primitive form the plurality in the issue unit is processed if no dependency is detected between the subsequent primitive and the primitives in the at least two which have not yet been completely processed.

5. The method of claim 3 wherein the step of detecting is comprised of:
    comparing the destination region bounding box coordinates for the primitives in the at least two which have not yet been completely processed with the destination region bounding box coordinates and the source region bounding box coordinates for the next primitive to be processed in order to detect a dependency; and
    detecting a dependency if there is an overlap in the destination region bounding box coordinates for the primitives in the at least two which have not yet been completely processed and either the destination region bounding box coordinates or the source region bounding box coordinates for the next primitive to be processed.

6. An apparatus for providing out of order processing of a plurality of graphics primitives comprising:
    an issue unit for storing the plurality of graphics primitives including source and destination region bounding box coordinates for each primitive in the plurality;

two or more accelerators for processing at least two of the primitives in the plurality at the same time, where the at least two of the primitives have no dependency; and comparators for detecting a dependency between a next primitive to be processed from the plurality in the issue unit and the primitives in the at least two which have not yet been completely processed, wherein the next primitive to be processed from the plurality in the issue unit is skipped if a dependency is detected.

7. The apparatus of claim 6, wherein a subsequent primitive from the plurality in the issue unit is processed if no dependency is detected between the subsequent primitive and the primitives in the at least two which have not yet been completely processed.

8. The apparatus of claim 6 wherein the issue unit comprises:

source reservation stations for storing the source region bounding box coordinates for each primitive in the plurality stored in the issue unit; and destination reservation stations for storing the destination region bounding box coordinates for each primitive in the plurality stored in the issue unit.

9. The apparatus of claim 8 wherein the comparators compare the destination region bounding box coordinates for the primitives in the at least two which have not yet been completely processed with the destination region bounding box coordinates and the source region bounding box coordinates for the next primitive to be processed in order to detect a dependency.

10. The apparatus of claim 9 wherein a dependency is detected if there is an overlap in the destination region bounding box coordinates for the primitives in the at least two which have not yet been completely processed and either the destination region bounding box coordinates or the source region bounding box coordinates for the next primitive to be processed.

* * * * *